Figure 1:
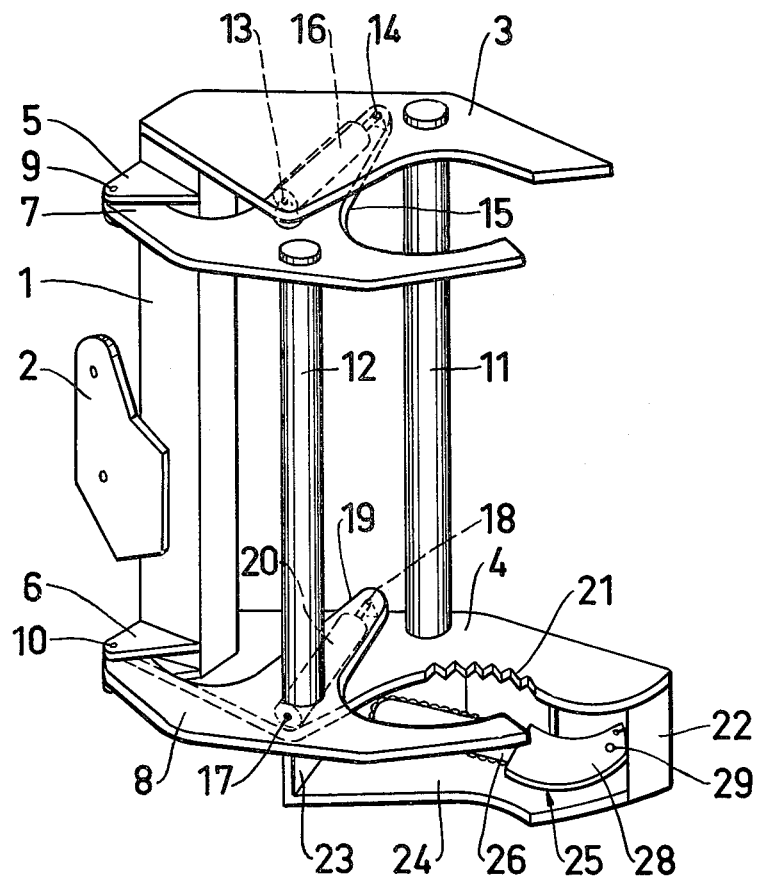

United States Patent [19]
Forslund et al.

[11] 3,885,610
[45] May 27, 1975

[54] TREE HARVESTING DEVICE FOR HYDRAULIC OPERATION

[75] Inventors: Erik Torsten Forslund; Bo Emil Fredrik Morenius, both of Alfta, Sweden

[73] Assignee: Ostbergs Fabriks AG, Alfta, Sweden

[22] Filed: Oct. 10, 1973

[21] Appl. No.: 405,009

[30] Foreign Application Priority Data
Oct. 17, 1972 Sweden.............................. 13363/72

[52] U.S. Cl.............................. 144/34 R; 144/3 D
[51] Int. Cl............................................. A01g 23/08
[58] Field of Search..... 83/795; 144/2 Z, 3 D, 34 R, 144/34 A, 34 B, 34 E, 309 AC

[56] References Cited
UNITED STATES PATENTS

| | | |
|---|---|---|
| 3,102,563 | 9/1963 | Horncastle.......................... 144/3 D |
| 3,140,736 | 7/1964 | Propst................................. 144/3 D |
| 3,254,686 | 6/1966 | Boyd et al........................ 144/3 D X |
| 3,348,592 | 10/1967 | Winblad et al. ..................... 144/3 D |
| 3,613,752 | 10/1971 | Davis, Jr. ........................ 144/3 D X |
| 3,640,322 | 2/1972 | Allen .............................. 144/3 D X |

Primary Examiner—Andrew R. Juhasz
Assistant Examiner—W. D. Bray
Attorney, Agent, or Firm—Pierce, Scheffler & Parker

[57] ABSTRACT

An improved tree harvesting mechanism, hydraulically operated, includes a vertical frame having fixed grip arms at top and bottom thereof as well as a movable grip arm for gripping a tree trunk. A cutting-off means, including a chain saw, is disposed under the lower fixed grip arm and is supported in a holder which is pivotable in such manner that the saw can be swung outward for engagement with a tree trunk.

3 Claims, 2 Drawing Figures

TREE HARVESTING DEVICE FOR HYDRAULIC OPERATION

The present invention relates to a tree harvesting device for hydraulic operation, a vertical frame at the top and at the bottom supporting the end of both fixed arms as also a movable arm for gripping a tree trunk.

An important reason for changing over at the time from felling through chain sawing to felling through cutting or shearing the tree trunks was the fact that the saw in the swung-out position often got into contact with stones, gravel and other potentially damaging objects. This mostly spoiled the saw chain and/or its driving mechanism and, moreover, also caused personal injuries.

Thus in evaluating the cutting and shearing method it was concluded that the inevitable damages to the valuable sapwood at the cutting place (at shearing also damages in the centre of the trunk) weighed less than the above mentioned risks of saw and personal injuries.

The invention also effects a cure for this by the provision of a harvesting device operating with chain sawing with maintenance of its wood sparing properties simultaneously with the elimination of the risks for saw and personal injuries. This is characterized by a cutting means in the form of a guide provided with a saw chain placed under the lower fixed grip arm and having its holder pivoted near the outer end of the arm so that the guide can be swung from a position covered by said arm in a direction from the rear part of the arm for engagement with a tree trunk bearing against the same.

Figure 2:
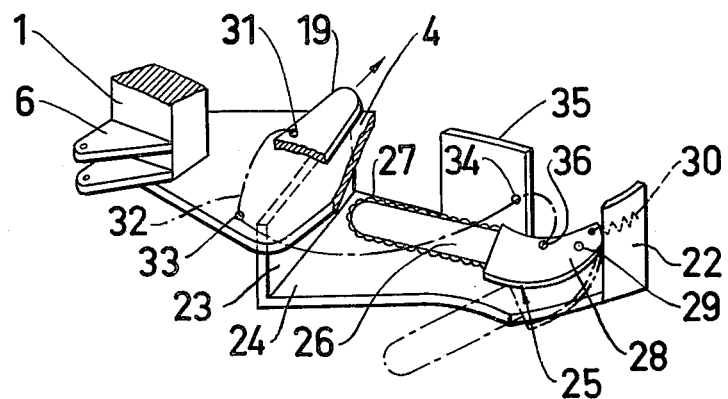

The invention is further described below, in more detail with reference to the accompanying drawing, where;

FIG. 1 shows a schematic perspective view of a tree harvesting device made according to the principle of the invention, and FIG. 2 a view of the lower part in FIG. 1 with certain portions broken away in order to make clear an important aspect of the invention.

The frame of the harvesting device consists in this case of a vertical beam 1, which on its sides is provided with fittings 2 (only one visible in the Figure) connected to the end of a crane jib or the like. An upper gripping arm 3 and a lower grip arm 4 are, each at one end thereof, fixed to the respective ends of the beam 1. Outstanding ears 5 and 6, respectively, are fixed to beam 1 at the top and at the bottom of the latter, and ends of the respective movable grip arms 7 and 8 are pivoted at the bearing points 9 and 10. The upper and the lower fixed grip arms 3 and 4 respectively are mutually connected by a bar 11. Analogously, the upper and the lower movable arms 7, 8 are connected to each other by a bar 12. Between a point 13 on the upper fixed arm 3 and a point 14 on an outrigger 15 from the upper movable arm 7 a hydraulic jack 16 is inserted. Analogously, a hydraulic jack 20 is inserted between a point 17 on the lower fixed arm 4 and a point 18 on an outrigger 19 from the lower movable arm 8.

It should be observed that contrary to the conventional constructions the respective bearing points 9 and 10 for the movable arms 7 and 8 are drawn back so far that the trunk gripping parts of the arms approach each other substantially parallelly when bringing the arms together. For this reason also the concavities of the arms can be executed considerably flatter than normal, which implies smaller arm motions for gripping and dropping a trunk. This property is accentuated by placing the hydraulic jacks 16 and 20 in the shown manner with the line of action in essentially the same direction as that of the arm movement. It is then obvious that the small motions being required for gripping or dropping a trunk are brought about especially rapidly and effectively by means of the optimally directed hydraulic jacks.

As is apparent from FIG. 1 the lower fixed arm 4 is on its inside provided with teeth or spikes 21 for for ensuring a firm grip on a trunk.

To the lower fixed arm 4 a bracket-like construction, consisting of legs 22, 23 and a yoke part, is connected. The bracket serves both as a protection and a bearing place for a cutting-off means 25 in the shown case a guide 26 with a chain saw 27 and a holder 28. The holder is journalled around a point 29 in the yoke part 24.

As is apparent from FIG. 2, where only the lower part of the harvesting device is shown and the larger part of both the lower fixed arm 4 as well as the lower movable arm 8 have been removed in order to visualize the special arrangement for the saw, a tension spring 30 actuates on a point of the holder 28 of the guide 26 spaced from its pivot axis 29 in a direction urging the guide back to its position below the fixed grip arm 4 (FIG. 1). From a point 31 on the outrigger 19 of the movable arm 8 a wire 32 runs down through an opening 33 in the lower fixed arm 4 and passes below it to and through an opening 34 in a support plate 35 upstanding from the yoke part 24 of the bracket and located behind the guide 26, wherefrom the wire is turned around the side edge of the plate 35 and is anchored in a point 36 of the holder 28 of the guide spaced from the pivot axis 29 of the holder.

Suppose now that a tree trunk with a relatively small diameter is caught between the concavities of the arms, and the hydraulic jacks 16 and 20 are activated, the outrigger 19 of the lower movable arm 8 will in consequence of the almost parallel bringing together of the grip arms project in the direction of the arrow and stretch the wire 32. The wire length is so adapted relative to the swinging motions of the arm that the wire is entirely tightened and, thus, the swinging out of the guide is stopped (see the dash-and-dot-lined position in FIG. 2) when the guide with approximately half width has emerged from the through-sawn tree trunk. Both by the guide being swung from within (i.e. from the back of the tree) and outwards, which normally is not the case in the known harvesting devices, and also by the guide automatically being stopped immediately after the through-sawing of the tree trunk, the risk is eliminated for the running saw-chain to come into contact with foreign objects.

The invention is not limited to the above described embodiment but different details can be exchanged for others with equivalent function. Especially, the automatic limitation of the swinging out of the cutting-off means can be varied in various manners, particularly the path of the wire. Moreover, the invention is not bound to the shown cutting-off means but this means with its associated bearing bracket could be replaced by another cutting-off device.

What is claimed is:

1. Tree harvesting device for hydraulic operation, with a vertical frame supporting at the top and at the bottom the ends of a pair of fixed upper and lower grip arms as well as a pair of movable grip arms for gripping a tree trunk, characterized in that a cutting-off means in the form of a guide provided with a supporting holder and a chain saw is located under the said lower fixed grip arm, said holder being pivoted near the outer end of the fixed arm, so that the guide from a position covered by said fixed arm can be swung outwards in direction from the inner end of the fixed grip arm for engagement with a tree trunk bearing against said part, said device further including a resilient returning device inserted between the holder of the cutting-off means and a fixed point located on the said lower fixed arm, a wire extending from a point on the lower moveable grip arm passing a guiding point on the adjacent fixed grip arm and ending at a point on said supporting holder spaced from its journal axis, whereby when bringing the grip arms together, said wire is tightened for limitation of the maximum swinging-out of the cutting-off means in dependence of the diameter of the gripped tree trunk.

2. Harvesting device according to claim 1, characterized by a protective bracket comprising a yoke part and two legs, said holder being journalled on the yoke part, and the legs shielding the ends of the holder and the guide, respectively, and having their upper ends fastened to the under surface of the fixed grip arm.

3. Harvesting device according to claim 1, characterized in that each of the movable grip arms is shaped with a projection extending in the general direction of the inwards swinging of the arm which projection to such a degree overlaps an oppositely directed projection on the fixed arm that a hydraulic jack can be inserted with its cylinder end connected to the end of the projection of the fixed arm and the piston rod end connected to the end of the projection of the movable arm.

* * * * *

UNITED STATES PATENT OFFICE
CERTIFICATE OF CORRECTION

PATENT NO. : 3,885,610
DATED : May 27, 1975
INVENTOR(S) : Erik Torsten Forslund and Bo Emil Fredrik Morenius It is certified that error appears in the above-identified patent and that said Letters Patent are hereby corrected as shown below:

[73] Assignee: Ostbergs Fabriks AB, Alfta, Sweden

Signed and Sealed this twenty-sixth Day of August 1975

[SEAL]

Attest:

RUTH C. MASON
Attesting Officer

C. MARSHALL DANN
Commissioner of Patents and Trademarks